(12) United States Patent
Franke et al.

(10) Patent No.: US 11,465,691 B2
(45) Date of Patent: Oct. 11, 2022

(54) HATCH DOOR WITH MECHANICALLY SECURED REAR AND SIDE SPOILER CONNECTION

(71) Applicant: Volkswagen Aktiengesellschaft, Wolfsburg (DE)

(72) Inventors: Sven Franke, Calberlah (DE); Thorben Boesche, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 246 days.

(21) Appl. No.: 16/901,908

(22) Filed: Jun. 15, 2020

(65) Prior Publication Data
US 2020/0391806 A1  Dec. 17, 2020

(30) Foreign Application Priority Data
Jun. 14, 2019  (DE) ...................... 10 2019 116 206.8

(51) Int. Cl.
*B62D 27/00* (2006.01)
*B62D 35/00* (2006.01)
*B60Q 1/30* (2006.01)

(52) U.S. Cl.
CPC ........... *B62D 27/00* (2013.01); *B62D 35/007* (2013.01); *B60Q 1/30* (2013.01)

(58) Field of Classification Search
CPC .. B62D 27/023; B62D 27/026; B62D 35/007; B62D 35/008; B60J 5/101
USPC ...................................... 296/180.1, 56, 146.8
See application file for complete search history.

(56) References Cited

U.S. PATENT DOCUMENTS

| | | | |
|---|---|---|---|
| 5,013,081 A | 5/1991 | Cronce et al. | |
| 5,360,253 A | 11/1994 | Sasaki et al. | |
| 6,672,651 B1 | 1/2004 | Shuen | |
| 7,658,357 B2 * | 2/2010 | Babian | B60R 11/00 248/176.1 |
| 9,126,641 B1 * | 9/2015 | Sato | B62D 35/007 |
| 2007/0228764 A1 * | 10/2007 | Shimizu | B62J 17/02 180/219 |
| 2015/0291232 A1 * | 10/2015 | Watanabe | B23K 31/02 296/180.1 |
| 2016/0152287 A1 * | 6/2016 | Fuchs | B62D 35/007 296/180.1 |
| 2016/0272052 A1 | 9/2016 | Fujiwara et al. | |
| 2016/0303954 A1 | 10/2016 | Kawashima et al. | |

(Continued)

FOREIGN PATENT DOCUMENTS

| | | | | |
|---|---|---|---|---|
| CN | 106143078 A | * 11/2016 | ................ | B60J 5/10 |
| DE | 43 00 114 A1 | 7/1993 | | |

(Continued)

OTHER PUBLICATIONS

Machine translation of DE-202014101058.*
Machine translation of CN-106143078.*

*Primary Examiner* — D Glenn Dayoan
*Assistant Examiner* — Kevin P Weldon
(74) *Attorney, Agent, or Firm* — Muncy, Geissler, Olds & Lowe, P.C.

(57) ABSTRACT

A hatch door, which comprises a rear spoiler and a side spoiler, which are fixedly connected to a base structure of the hatch door, wherein it is provided according to the invention that the rear spoiler is additionally disposed mechanically reversibly secured with respect to the side spoiler and vice versa by a mechanical connection.

10 Claims, 3 Drawing Sheets

(56) References Cited

U.S. PATENT DOCUMENTS

2017/0225548 A1    8/2017  Kato
2019/0283691 A1*   9/2019  Auerbach ............ B62D 35/007

FOREIGN PATENT DOCUMENTS

| DE | 202014101058 U1 * | 7/2015 | ............ B62D 25/16 |
|---|---|---|---|
| DE | 10 2014 103 541 A1 | 10/2015 | |
| EP | 2436580 A2 | 4/2012 | |
| EP | 2842842 A1 | 3/2015 | |
| KR | 20010060321 A | 7/2001 | |
| KR | 20030005893 A | 1/2003 | |
| WO | WO2015/135661 A1 | 9/2015 | |

\* cited by examiner

HATCH DOOR WITH MECHANICALLY SECURED REAR AND SIDE SPOILER CONNECTION

This nonprovisional application claims priority under 35 U.S.C. § 119(a) to German Patent Application No. 10 2019 116 206.8, which was filed in Germany on Jun. 14, 2019, and which is herein incorporated by reference.

BACKGROUND OF THE INVENTION

Field of the Invention

The present invention relates to a hatch door, which comprises a rear spoiler and a side spoiler, which are fixedly connected to a base structure of the hatch door.

Description of the Background Art

The publication US 2016/0303954 A1 describes a recess on a door outer panel, wherein a pin is provided on a rear spoiler. The pin abuts a front wall of the recess, thereby enabling the rear spoiler to be positioned in a vehicle front-rear direction with respect to a door.

The publication US 2017/0225548 A1 describes a backdoor structure for a vehicle, wherein the structure comprises two window panes, a rear spoiler, and a hatch door frame which supports both window panes and the rear spoiler. The two window panes and rear spoiler are glued together.

Cited further are the publications DE 10 2014 103 541 A1, U.S. Pat. Nos. 5,013,081 A, 6,672,651 B1, US 2016/0 272 052 A1, and DE 43 00 114 A1, which each disclose spoilers and their connection methods on hatch doors.

SUMMARY OF THE INVENTION

It is therefore an object of the present invention to ensure a position of spoiler add-on parts on a hatch door.

The starting point of the invention is a hatch door, which comprises a rear spoiler and a side spoiler, which are fixedly connected to a base structure of the hatch door.

It is provided according to the invention that the rear spoiler is additionally disposed reversibly secured with respect to the side spoiler and vice versa by a mechanical connection. The rear spoiler and the side spoiler are connected to one another via their end faces, wherein the mechanical connection comprises at least one plug-in element and at least one receiving element, which are optionally formed and disposed opposite one another in the rear spoiler or the side spoiler.

The at least one plug-in element can be formed or disposed in the side spoiler and the at least one receiving element in the rear spoiler.

At least one plug-in element can be disposed integrated in an outer side spoiler element.

The spoiler element can have an inner support structure.

This inner support structure can be connected to the hatch door, wherein the outer side spoiler element in an assembled state is securely connected to the inner support structure of the spoiler and according to the invention via the at least one plug-in element to the rear spoiler, because the at least one plug-in element of the side spoiler in the assembled state engages in a receiving opening of the receiving element of the rear spoiler, as will be explained in more detail in the description.

The at least one receiving element can be a receiving tab that is orthogonally positioned from an outer rear spoiler element of the rear spoiler.

The orthogonally positioned receiving tab can have a receiving opening, wherein the outer rear spoiler element is connected to an inner support structure of the rear spoiler, which is connected to the inner support structure of the hatch door and, according to the invention, via the receiving opening to the side spoiler, because the plug-in element of the side spoiler engages in the receiving opening of the outer rear spoiler element.

In another preferred embodiment, in a second embodiment variant, the at least one receiving element is designed as a receiving opening, which is located in an orthogonally positioned edge of the inner support structure of the rear spoiler.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
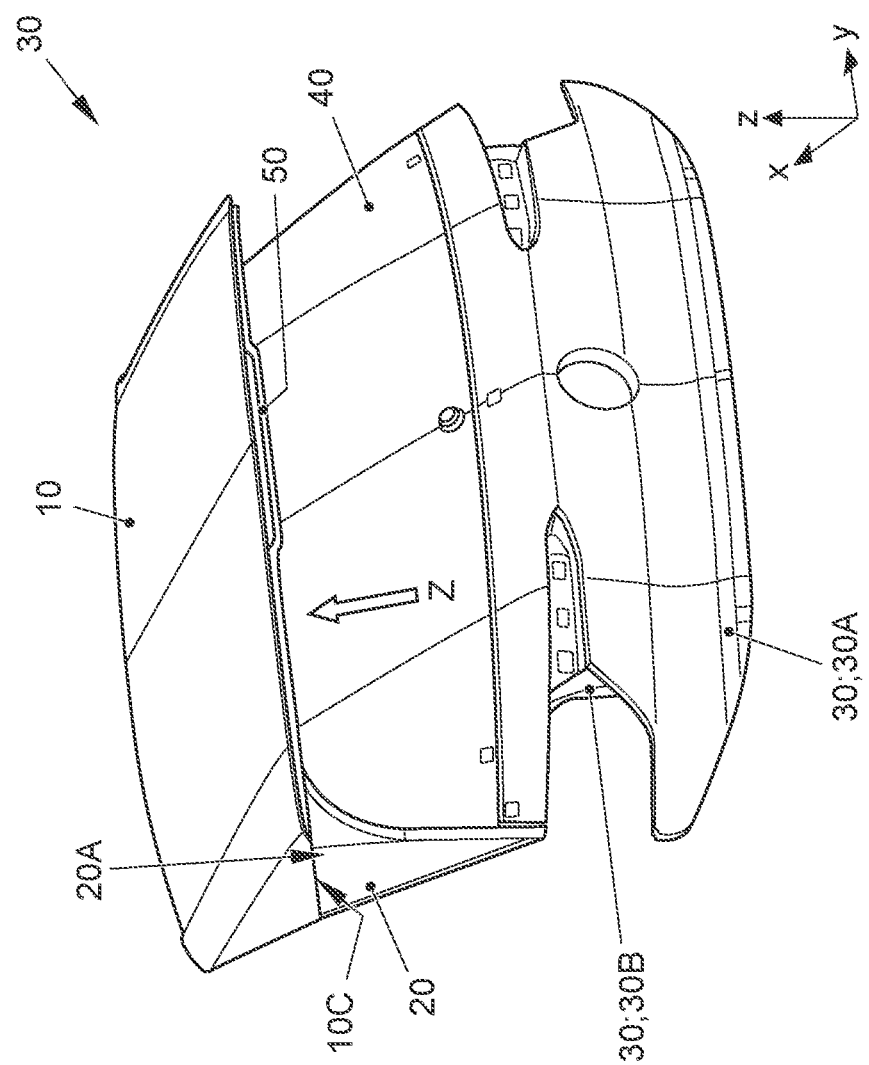
FIG. 1 shows a perspective view of a hatch door comprising a side spoiler and a rear spoiler.

FIG. 1 shows a perspective view of a hatch door 30 from its outer side. In a known manner, hatch door 30 has a base structure 30B to which various components are attached. On the one hand, the outer structure, in particular the outer panel shown in FIG. 1, is attached to base structure 30B as outer hatch door element 30A of hatch door 30. On the other hand, it is clear from FIG. 1 that a rear window is attached to base structure 30B.

In some vehicles, in addition side spoilers 20, which a rear spoiler 10 adjoins at the top, are disposed to the side of rear window 40. Finally, a rear spoiler 10 is attached to base structure 30B.

Overall, hatch door 30 thus comprises base structure 30B of hatch door 30A, the outer structure 30A of hatch door 30A, rear window 40, side spoilers 20, and rear spoiler 10.

In a conventional assembly process for hatch door 30, an end face 10C (compare FIGS. 1 and 1A) of rear spoiler 10 adjoins an opposite end face 20C (compare FIG. 1C) of side spoiler 20.

The side spoiler that is opposite side spoiler 20 shown in FIG. 1 when viewed in the horizontal direction is not visible due to the perspective view according to FIG. 1.

In the conventional assembly process, there is no connection between end faces 10C, 20C of rear spoiler 10 and side spoilers 20.

Side spoiler 20 and rear spoiler 10 in themselves are separately attached to base structure 30B of hatch door 30. Analogous to side spoiler 20, rear spoiler 10 likewise comprises an outer rear spoiler element 10A and an inner support structure 10B, wherein outer rear spoiler element 10A is also preferably glued to inner support structure 10B of the rear spoiler.

Side spoiler 20 and rear spoiler 10 are connected to base structure 30B of hatch door 30 via inner support structures 20B and 10B.

The previous assembly process without connection between end faces 10C, 20C of rear spoiler 10 and side spoiler(s) 20 has the advantage that rear spoiler 10 or side spoiler 20 can be disassembled independently of one another, but to increase the structural strength of hatch door 30 and its adjacent components, in particular rear spoiler 10 adjacent to side spoiler 20, a reversible mechanical connection is proposed, in the sense of an additional mechanical securing, which at the same time enables easy disassembly and assembly of components 10, 20, as will be explained in detail below.

First Embodiment Variant

Figure 1A:
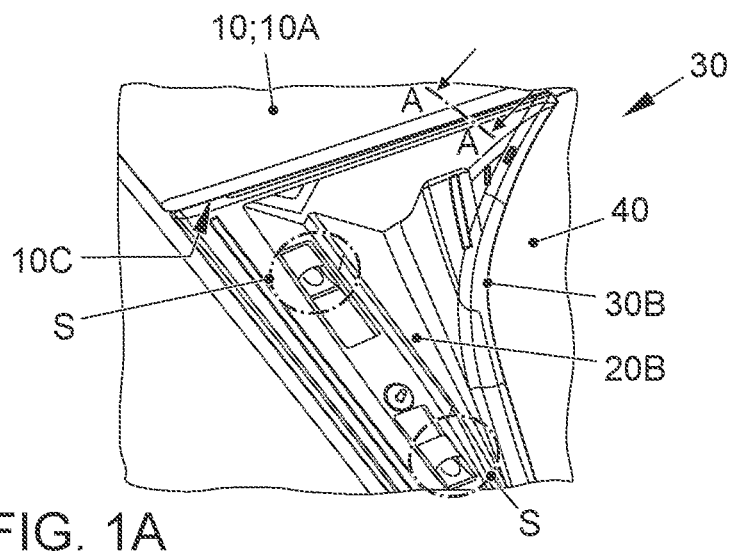
FIG. 1A is an enlarged perspective view of a support structure of the side spoiler, which is attached to a base structure of the hatch door in a first type of attachment, wherein a section line A-A is drawn in in FIG. 1A.

FIG. 1A shows the upper area of base structure 30B of hatch door 30, to which side spoiler 20 is attached via its inner support structure 20B in a first embodiment variant via a positive and non-positive connection, in particular the at least one screw connection S from the inside, i.e., from the inner side of hatch door 30.

Side spoiler 20 comprises inner support structure 20B, on which spoiler element 20A, which is visible from the outside, is disposed in an attached, in particular a glued manner.

Inner support structure 20B of side spoiler 20 is screwed to base structure 30B of hatch door 30 according to FIG. 1A.

End face 10C of rear spoiler 10 can also be seen in FIG. 1A, because an outer side spoiler element 20A of side spoiler 20 is omitted in FIG. 1A for clarification.

Figure 1B:
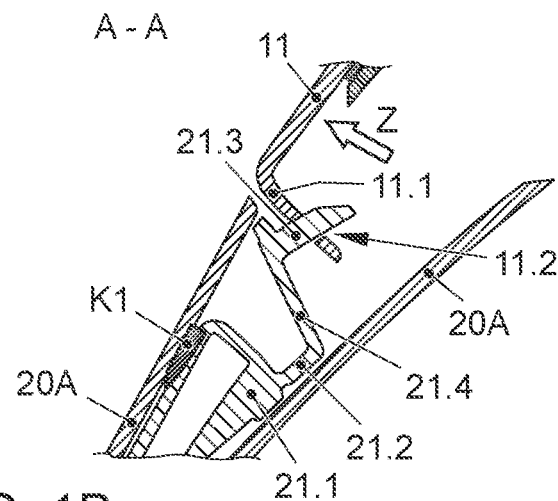
FIG. 1B shows a sectional view along the section line A-A in FIG. 1A of a mechanical securing of the side spoiler with respect to the rear spoiler.

FIG. 1A shows a section line A-A, the corresponding section A-A being shown in FIG. 1B.

It is provided according to the invention to connect together rear spoiler 10 and side spoiler 20 via their end faces 10C, 20C.

It is provided that an additional mechanical securing of rear spoiler 10 and side spoiler 20 is achieved by this connection when a force acts on rear spoiler 10 or the side spoiler.

Only by way of example, a force, acting in Z (compare FIG. 1) on end face 10C of rear spoiler 10, said face protruding slightly above rear window 40, with the mostly integrated rear lighting 50 (compare FIG. 1), in a car wash by the rotating cleaning rollers from bottom to top in the Z direction, acts on rear spoiler 10, which is reversibly connected to side spoiler(s) 20 by the mechanical securing described below.

Figure 1C:
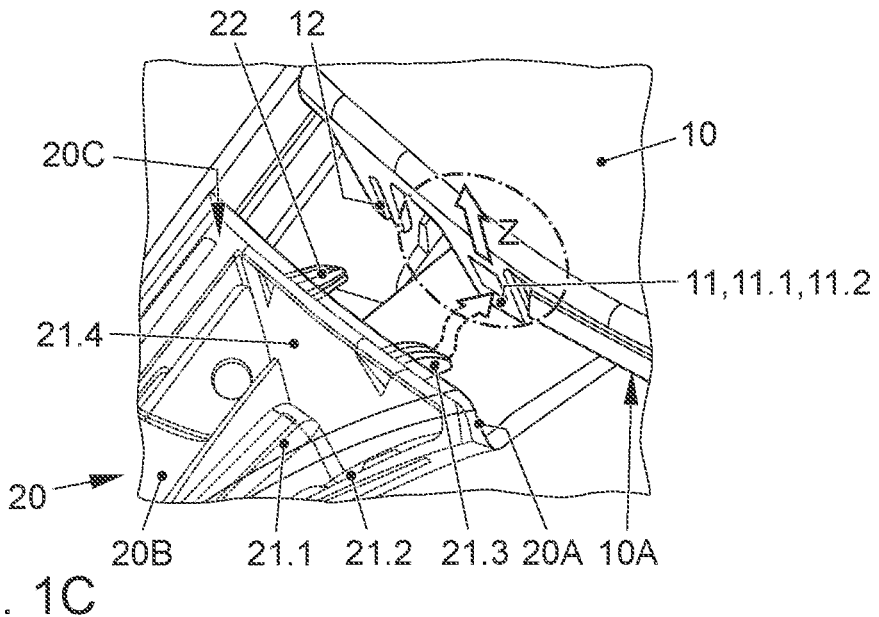
FIG. 1C shows a sectional view of the mechanical securing of the side spoiler with respect to the rear spoiler.

FIG. 1C shows in a further perspective view the provided positive mechanical connection between rear spoiler 10 and side spoiler 20, which will be described below in an overview with the section A-A according to FIG. 1B.

A receiving element 11 is disposed at the front side of rear spoiler 10, in particular in outer rear spoiler element 20A; it is arranged orthogonally to the surface of the outer rear spoiler element 20A of rear spoiler 10 and thus lies in end face 10C of rear spoiler 10, which in the assembled state lies opposite to end face 20C of side spoiler 20.

Receiving element 11 is designed as a receiving tab 11.1. Receiving tab 11.1 has a receiving opening 11.2. In addition, not only is receiving tab 11.1 positioned orthogonally on end face 10C of rear spoiler 10, but a guide element 12, which has an open guide groove 12.1 pointing toward base structure 30B of hatch door 30, is also disposed in outer rear spoiler element 20A.

Located opposite in the assembled state, a plug-in element 21, which is thus disposed in the shell-like structure, i.e., the upper shell of outer spoiler element 20A of side spoiler 20, is formed on end face 20C of side spoiler 20, in particular in an installation space of outer spoiler element 20A (compare FIG. 1B), and in the exemplary embodiment is securely connected to the inner walls of the spread upper shell 20A of side spoiler 20 by at least one adhesive connection K1. It is understood that adhesive connection K1 is only one of many possibilities for attaching plug-in element 21 in side spoiler 20.

Plug-in element 21 has a base part 21.1, which preferably merges integrally into inner support structure 20B of side spoiler 20. In other words, plug-in element 21 is disposed integrally on inner support structure 20B, preferably injection molded, and protrudes at the end face according to FIG. 1B from the installation space of upper shell 20A of side spoiler 20, which surrounds inner support structure 20B of side spoiler 20 at least partially, in particular in the upper area of side spoiler 20, as is apparent from FIG. 1C.

In the exemplary embodiment, support structure 20B (not shown) of side spoiler 20 or, according to FIG. 1B, base part 21.1 of plug-in element 21 is glued to upper shell 20A of side spoiler 20.

A member 21.2 is connected to base part 21.1, which member at the end forms the actual plug-in part, a plug-in tongue 21.3, which is used for the mechanical connection with respect to rear spoiler 10.

It is particularly clear in FIG. 1C that plug-in tongue 21.3 and a guide tongue 22, disposed in the same plane (transversely to the z direction), are disposed together on a type of shield 21.4, which is guided via member 21.2 to base part 21.1, which in turn merges into support structure 20B or is part of support structure 20B.

When rear spoiler 10 is assembled with side spoiler 20, both plug-in tongue 21.3 and guide tongue 22 can move smoothly into receiving openings 11.2 of receiving tab 11.1 and also into guide groove 12.1 of guide element 12, possibly with a slight compensating movement of plug-in tongue 21.3 into receiving openings 11.2 of receiving tab 11.1 as well as into guide groove 12.1.

The elements 11 and 12 are preferably also injection molded in one piece onto outer rear spoiler element 10A and therefore advantageously also do not need to be attached separately.

In addition, it becomes particularly clear in FIG. 1D that guide tongue 22 and also plug-in tongue 21.3 are slightly beveled in the front area, so that an even more secure insertion is ensured in a further advantageous manner.

As already explained, the positive connection ensures that a force acting in Z and which is indicated by the force arrows in FIGS. 1B and 1C is not able to bring rear spoiler 11, in particular outer rear spoiler element 10A, out of its desired position, with respect to support structure 10B, wherein support structure 10B of rear spoiler element 10A is attached to base structure 30B of hatch door 30B.

For the sake of completeness, it is pointed out that rear spoiler 10 has, for example, a shell-like shape and has outer rear spoiler element 10A and inner support structure 10B, wherein the upper shell of rear spoiler 10, shown in FIG. 1B, as outer rear spoiler element 10A is glued to the lower shell (not shown in more detail) as support structure 10B of rear spoiler element 10A or is connected together in a welding process, in particular in friction, needle, and ultrasonic welding.

Especially in the case of such a shell-like structure, the upper shell of rear spoiler 10 is now additionally secured against any detachment relative to the lower shell of rear spoiler 10.

The positive and non-positive connection of side spoiler 20 explained above for the first type of attachment, in particular the at least one screw connection S of support structure 20B to base structure 30B of hatch door 30, which is produced from the inside of hatch door 30, is only made with regard to the assembly sequence when side spoiler 20 has been positively inserted into rear spoiler 10.

Second Embodiment Variant

For the second embodiment variant, FIG. 2A again shows in an enlarged perspective view inner support structure 20B of side spoiler 20, which in this embodiment variant is attached to base structure 30B of hatch door 30 in a second type of attachment.

Figure 2A:
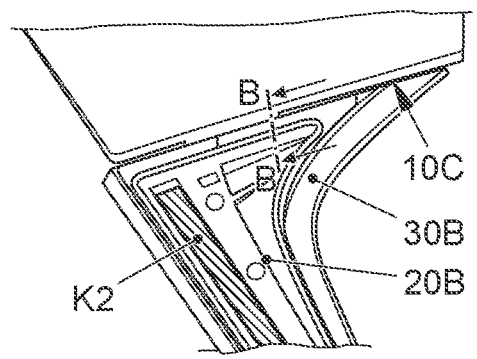
FIG. 2A shows an enlarged perspective view of a support structure of the side spoiler, which is attached to a base structure of the hatch door in a second type of attachment, wherein a section line B-B is drawn in in FIG. 2A.

The section line B-B is also drawn in in FIG. 2A. The second type of attachment in this second embodiment variant (in contrast to the first embodiment variant) is a material adhesive connection K2 between support structure 20B of side spoiler 20 and base structure 30B of hatch door 30, which, in contrast to the first type of attachment, is formed on the outside of hatch door 30.

It is understood that the second type of attachment can also be realized within the first embodiment variant or the first type of attachment within the second embodiment variant.

Figure 2B:
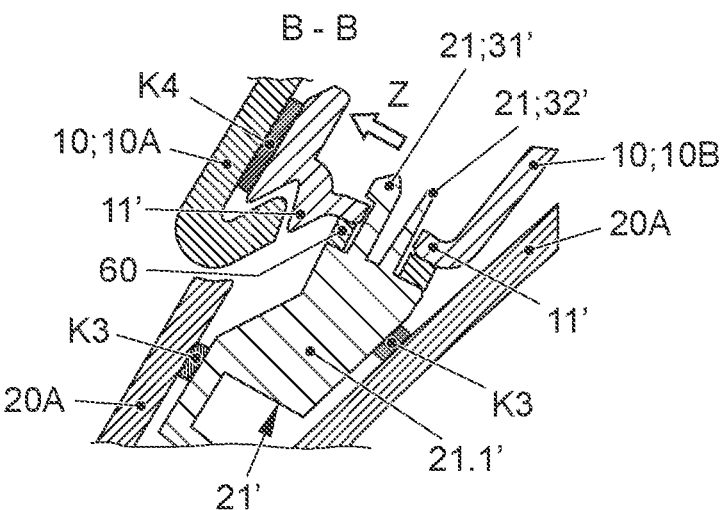
FIG. 2B shows a sectional view along the section line B-B in FIG. 2A of a mechanical securing of the side spoiler with respect to the rear spoiler.
Figure 2C:
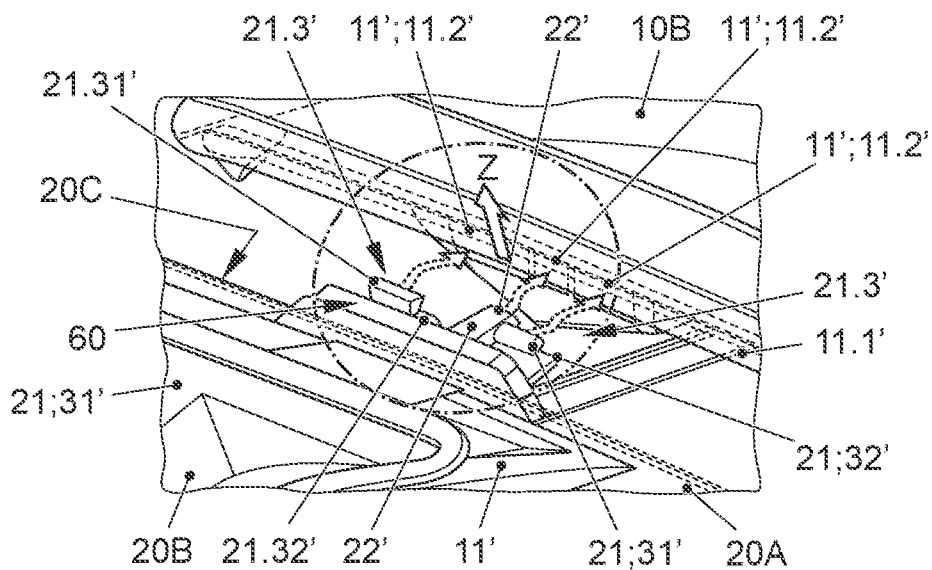
FIG. 2C shows a sectional view of the mechanical securing of the side spoiler with respect to the rear spoiler.

FIG. 2B in the sectional view in conjunction with FIG. 2C according to the section line B-B shows a further preferred embodiment of a mechanical securing of side spoiler 20 with respect to rear spoiler 10 in the second embodiment variant, wherein now at least one receiving opening 11.2' is arranged in an orthogonally positioned edge 11.1' of inner support structure 10B, wherein in the exemplary embodiment, even three receiving openings 11.2' (compare FIG. 2C) are formed within inner support structure 10B of rear spoiler 10 in orthogonally positioned edge 11.1', wherein there is a significant difference from the first embodiment variant.

However, receiving openings 11.2' are arranged on end face 10C of rear spoiler 10 analogous to the first embodiment variant.

In the sectional view in FIG. 2B, it is clear that outer rear spoiler element 10A is connected to inner support structure 10B of rear spoiler 10 via a connection K4, which again is preferably designed as an adhesive connection.

A plug-in element 21' is disposed within the installation space of upper shell 20A of side spoiler 20, analogous to the first embodiment variant.

Plug-in element 21' again comprises a base part 21.1' which is connected, in particular materially glued by means of a further adhesive connection K3, to the inner walls of upper shell 20A of side spoiler 20, said shell which has the installation space.

Plug-in element 21' has a base part 21.1', which preferably merges integrally into inner support structure 20B of side spoiler 20. In other words, plug-in element 21' is disposed integrally on inner support structure 20B of side spoiler 20, preferably injection molded, and protrudes at the end face according to FIG. 2B from the installation space of upper shell 20A of side spoiler 20, which surrounds inner support structure 20B of side spoiler 20 at least partially, in particular in the upper area of side spoiler 20, as is apparent from FIG. 2C.

In the second embodiment variant, a plug-in tongue 21.3' is formed on base part 21.1' analogous to the first embodiment variant, but now with a latching function, wherein plug-in tongue 21.3' has a plug-in tongue member 21.31' with a latching step element or a latching step and in the exemplary embodiment additionally a guide member 21.32'.

As becomes clear in FIG. 2C, guide member 21.32' rests on one side in receiving opening 11.2', whereas plug-in tongue member 21.31' engages with its latching step behind receiving opening 11.2' on the other side, so that side spoiler 20 is reversibly locked via inner support structure 20B on inner support structure 10B of rear spoiler 10 and thus is mechanically secured and disposed without rattling.

It becomes clear in FIG. 2C that the mechanical connection shown in FIG. 2B is preferably provided in a twofold design, wherein a guide tongue 22' is additionally formed between these two plug-in tongues 21.3', a guide tongue which is formed somewhat longer overall and first and foremost engages in the middle receiving opening 11.2' and forms a guide for lateral plug-in tongues 21.3' with the latching element as soon as side spoiler 20 is connected to rear spoiler 10.

The second embodiment variant therefore concerns not only a mechanical plug-in connection, but a mechanical plug-in and locking connection is formed, which, however, is also reversible in that during disassembly plug-in tongue member 21.31' with the positioned latching step 21.31' is actuated using a narrow tool (which is inserted between end faces 10C, 20C), and the latching step disengages from receiving opening 11.2', after which side spoiler 20 can be removed.

For the sake of completeness, it is also mentioned that a buffer element 60, preferably in the form of a foam tape, is disposed between end face 10C of rear spoiler 10 and end face of base part 21.1', said face being directed towards rear spoiler 10, wherein it can be seen in FIG. 2C that this foam tape surrounds and buffers the entire connection area in the case of a multiple arrangement of plug-in latching elements 11', 21' according to FIG. 2C.

The material connection of side spoiler 20, explained above for the second type of attachment, in particular the at least one adhesive connection K2 of support structure 20B to base structure 30B of hatch door 30, from the outer side of hatch door 30, does not take place with respect to the assembly sequence until side spoiler 20 has been inserted into rear spoiler 10 in a positive and non-positive manner.

Advantageously, two embodiment variants are thus available to mechanically secure a side spoiler 20 with respect to a rear spoiler 30 or vice versa.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A hatch door comprising:
   a rear spoiler; and
   a side spoiler, the rear spoiler and side spoiler are fixedly connected to a base structure of the hatch door,
   wherein the rear spoiler is disposed mechanically reversibly secured to the side spoiler by a mechanical connection,
   wherein an end face of the rear spoiler is connected to an end face of the side spoiler,
   wherein the mechanical connection comprises at least one plug-in element and at least one receiving element, which are formed and disposed opposite one another in the rear spoiler or the side spoiler,
   wherein the at least one plug-in element is formed or disposed in the side spoiler and the at least one receiving element is formed or disposed in the rear spoiler,
   wherein the side spoiler has an inner support structure that is disposed inside of an outer side spoiler element, and wherein the at least one plug-in element is disposed on the inner support structure of the side spoiler as a single piece or multiple pieces, and
   wherein the inner support structure of the side spoiler is connected to the base structure of the hatch door, wherein the outer side spoiler element of the side spoiler, in an assembled state, is securely connected to the inner support structure of the side spoiler, and wherein, in the assembled state, the at least one plug-in element of the inner support structure of the side spoiler engages in a receiving opening of the at least one receiving element of the rear spoiler to connect the side spoiler to the rear spoiler.

2. The hatch door according to claim 1, wherein the at least one receiving element is a receiving tab which is orthogonally positioned from an outer rear spoiler element of the rear spoiler and has the receiving opening, wherein the outer rear spoiler element is connected to an inner support structure of the rear spoiler, wherein the inner support structure of the rear spoiler is connected to the base structure of the hatch door, and wherein the at least one plug-in element of the side spoiler engages in the receiving opening of the outer rear spoiler element so as to connect the outer rear spoiler element of the rear spoiler to the side spoiler.

3. The hatch door according to claim 1, wherein the receiving opening is located in an orthogonally positioned edge of an inner support structure of the rear spoiler, wherein the inner support structure of the rear spoiler, in the assembled state, is connected to an outer rear spoiler element of the rear spoiler, and wherein, in the assembled state, the at least one plug-in element of the side spoiler engages in the receiving opening of the inner support structure of the rear spoiler so as to connect the inner support structure of the rear spoiler to the side spoiler.

4. The hatch door according to claim 2, wherein the orthogonally positioned receiving tab of the outer rear spoiler element forms the end face of the rear spoiler, wherein in the assembled state, the end face of the rear spoiler is opposite to the end face of the side spoiler, and wherein the at least one plug-in element of the side spoiler is disposed on the end face of the side spoiler.

5. The hatch door according to claim 1, wherein the at least one plug-in element includes at least one plug-in tongue or at least one plug-in tongue with a latching step element.

6. The hatch door according to claim 5, wherein the at least one plug-in element further includes a guide tongue which is separate from the at least one plug-in tongue or the at least one plug-in tongue with the latching step element.

7. The hatch door according to claim 3, wherein the orthogonally positioned edge of the inner support structure of the rear spoiler forms the end face of the rear spoiler, wherein in the assembled state, the end face of the rear spoiler is opposite to the end face of the side spoiler, and wherein the at least one plug-in element of the side spoiler is disposed on the end face of the side spoiler.

8. The hatch door according to claim 1, wherein the inner support structure of the side spoiler is connected to the outer side spoiler element of the side spoiler by adhesive.

9. The hatch door according to claim 1, wherein the at least one plug-in element is monolithic with the inner support structure of the side spoiler.

10. The hatch door according to claim 3, wherein the inner support structure of the rear spoiler is connected to the outer rear spoiler element of the rear spoiler by adhesive.

* * * * *